Nov. 27, 1928.  1,693,132
W. C. BAXTER
METHOD FOR USE IN THE MANUFACTURE OF SHOES
Original Filed July 25, 1921
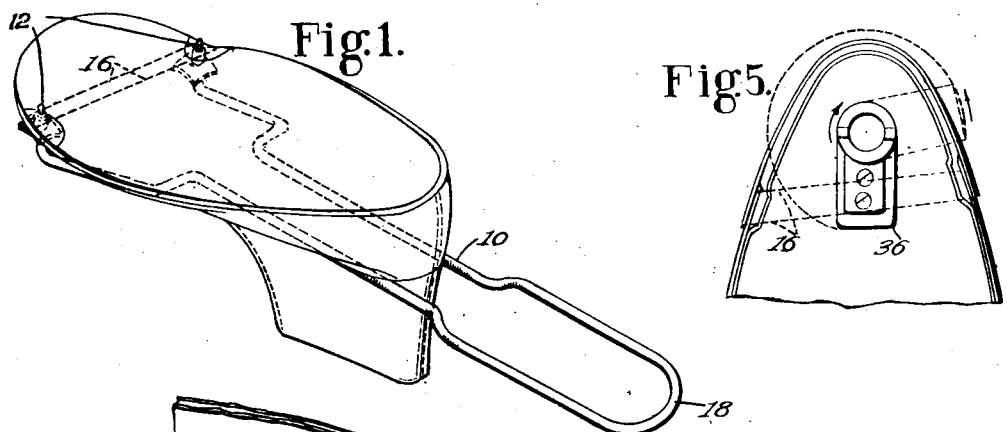
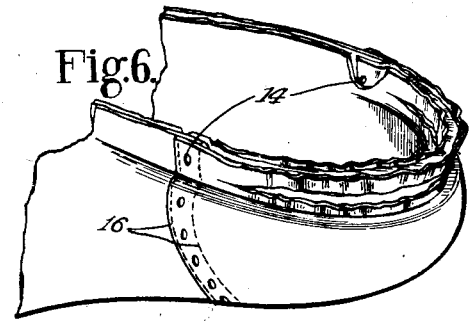
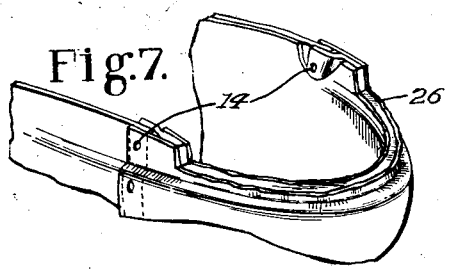
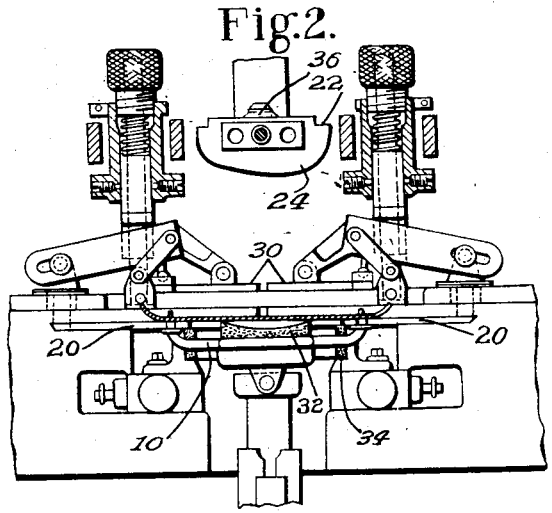
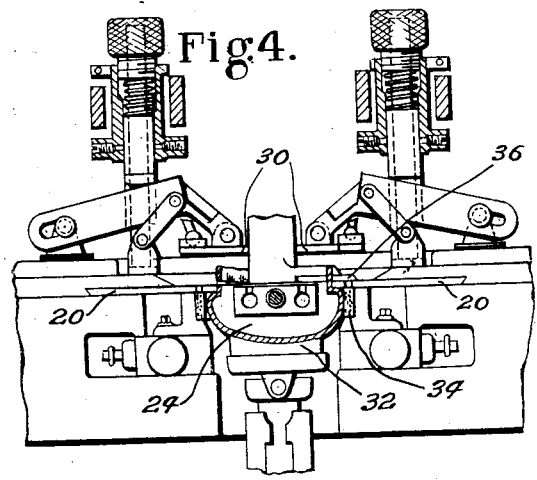
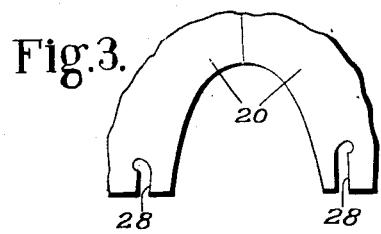
INVENTOR
William C. Baxter
By his Attorneys Patented Nov. 27, 1928.

1,693,132

UNITED STATES PATENT OFFICE.

WILLIAM C. BAXTER, OF BEVERLY, MASSACHUSETTS, ASSIGNOR TO UNITED SHOE MACHINERY CORPORATION, OF PATERSON, NEW JERSEY, A CORPORATION OF NEW JERSEY.

METHOD FOR USE IN THE MANUFACTURE OF SHOES.

Original application filed July 25, 1921, Serial No. 487,394. Divided and this application filed September 10, 1926. Serial No 134,711.

This invention relates to the manufacture of shoes, and in some of its aspects has more particular reference to the shaping or molding of the toe ends of shoe uppers, while in other aspects it is not limited to operations on that particular portion of a shoe. This application is a division of my copending application, Serial No. 487,394, filed on July 25, 1921, wherein are disclosed and claimed novel features of mechanism adapted for use in carrying out the method of this invention.

One of the objects which the invention has in view is the provision of a method adapted to facilitate the quick and accurate presentation of a shoe part in predetermined relation to means which operates thereon, the method herein illustrated including the use of a presenting tool to engage positioning surfaces provided on the shoe part in definite predetermined locations, for example by jig holes formed therein, and to move the part by such engagement into a predetermined position relatively to the operating means. In its application to the molding of the toe ends of uppers, the invention, as herein further exemplified, includes the use of a tool engaging the upper in jig holes at the opposite sides of the toe for carrying the upper to the molding machine and presenting it with its toe end in proper relation to the molding means. The upper is conveniently mounted on the presenting tool away from the machine, and the tool serves as convenient means for supporting the upper in presenting it to the machine. After the upper has been properly positioned, the tool is removed to permit the molding operation to be performed.

In a further aspect, the invention provides a novel method of shaping and trimming shoe upper materials. Under some conditions the trimming of the margin of the toe end of the upper, which is necessary, for example, in welt shoe work prior to the welt-sewing operation, may be most conveniently and effectively performed while the upper is under shaping or molding pressure. This is especially true where, as herein illustrated, the toe of the upper is molded, off the last, prior to the side-lasting of the shoe. It is desirable, however, that in the side-lasting operation the excess margin of the upper at the ends of the tip seam remain in position to be engaged and pulled by the gripper of the lasting machine. In accordance with this invention, therefore, the toe of the upper is trimmed between points located in front of the tip seam, so that the upper at the ends of the tip seam is left untrimmed. In accordance with another object, the trimming of the upper while on a form, or while under shaping pressure, is so effected as to leave the waste material attached to the upper. An advantage in this is that there is no danger of interference with the operation of the upper-shaping or molding machine by an accumulation of waste material. After the upper has been removed from the machine the waste material resulting from the trimming may be readily detached at the convenience of the operator.

The invention will now be more particularly described by reference to the accompanying drawings, which illustrate the practice of the method by the use of mechanism such as shown and described in my copending application. It will be recognized, however, that the invention is not dependent upon the use of that particular mechanism.

In the drawings,

Fig. 1 illustrates how the upper is mounted on a presenting tool;

Fig. 2 illustrates how the upper is presented in proper relation to toe-molding instrumentalities by use of the tool;

Fig. 3 shows a portion of the molding means having slots to co-operate with the presenting tool to determine the proper position of the upper;

Fig. 4 illustrates how the upper is molded and held while its margin is trimmed;

Fig. 5 illustrates further the action of the trimming knife;

Fig. 6 is a view of the toe of the upper immediately after its removal from the molding form, with the waste material still attached; and Fig. 7 shows the toe after the waste material has been detached.

In the practice of the method of this invention there may be utilized a presenting tool 10 such as shown in Fig. 1, preferably formed of resilient metal and having opposite side portions arranged to receive between them and to support in inverted position the rear end portion of assembled upper materials, the opposite side portions of the tool being provided at one end with jig pins 12 for engaging the margin of the toe end of the upper in jig holes 14 (Figs. 6 and 7) located at the ends of the tip seam 16. The tool is sufficiently elongated to provide at the rear of the upper a loop-shaped handle portion 18 by which the tool may be manipulated in presenting the upper to the molding means. The position of the tool in presenting the upper is indicated in Fig. 2. The molding means illustrated, as more fully shown and described in the copending application, includes wipers 20 for wiping the marginal portion of the upper into a groove 22 of a form 24 over which the toe of the upper is molded, to produce an upstanding flange 26 adapted to be sewed to the rib of a welt shoe insole; and in the wipers are slots 28 (Fig. 3) for receiving the pins 12 of the presenting tool, these slots having at their inner ends offset portions to interlock with the pins and thus determine the proper relation of the toe of the upper to the molding devices. It will be seen that, when the upper is presented as illustrated in Fig. 2, its toe portion is outspread substantially in a plane upon the top face of the wipers.

In the molding operation clamp members 30 are first moved into position to clamp the margin of the upper outspread upon the wipers, and the presenting tool is then removed to permit the molding operation to proceed. Thereafter, by downward movement of the form 24, the intermediate portion of the toe of the upper is clamped upon a toe rest 32 which is yieldingly mounted to move downwardly with the form. The clamp members 30, while clamping the margin of the upper upon the wipers, permit it to slip in response to the pull thereon as the intermediate portion of the toe is depressed by the form, and at the same time the upper is upwiped about the end and the sides of the form by a toe band 34. At the end of the downward movement of the form the wipers 20 are advanced and closed to wipe the margin of the upper into the groove 22 of the form and thus to mold the flange 26 thereon, the clamp members 30 being lifted from the wipers.

While the wipers 20 are held in molding position, the upstanding margin of the upper is trimmed by a knife 36 which has a swinging movement indicated by dotted lines in Fig. 5 and makes a cut substantially in the plane of the top face of the wipers and substantially parallel to the edge of the upper. It will be seen that the knife cuts outwardly through the upper at one side of the toe and then moves lengthwise of the edge of the upper to the other side of the toe, the cut terminating at each side in front of the tip seam 16. This leaves a portion of the margin at each end of the tip seam untrimmed, so that a pull may be applied thereto in the side-lasting of the shoe. The knife cuts in a single plane, and therefore does not sever the waste material from the upper, thus avoiding such trouble and annoyance as might result from the presence of waste material among the operating parts of the machine. Fig. 6 shows the toe of the upper after removal from the machine with the waste material attached. The latter may then be conveniently removed by the use of a hand knife or other suitable means, leaving the toe in the condition illustrated in Fig. 7.

Having fully described my invention, what I claim as new and desire to secure by Letters Patent of the United States is:

1. That improvement in methods of making shoes which consists in utilizing a presenting tool to engage positioning surfaces provided in definite predetermined locations on a shoe part, for example on an upper, and to move the shoe part by such engagement into a predetermined position relatively to means for performing an operation thereon, and then removing the tool and operating on the part.

2. That improvement in methods of making shoes which consists in utilizing a presenting tool to engage a shoe part in one or more jig holes formed in said part and to move the part into a predetermined position relatively to an operating instrumentality, and then removing said tool and operating on the part thus positioned.

3. That improvement in methods of molding the toes of uppers which consists in utilizing a presenting tool to engage an upper in jig holes formed therein at opposite sides of the toe and to move the upper into a predetermined position relatively to a molding instrumentality, and then removing said tool from the upper and molding the upper thus positioned.

4. That improvement in methods of making shoes which consists in molding the toe end of an upper prior to the side-lasting operation to give it substantially the shape which it is to have in the finished shoe, and prior to the side-lasting operation trimming the marginal portion of the molded toe end of the upper only as far rearwardly as points located in front of the tip seam at the opposite sides of the toe.

5. That improvement in methods of making shoes which consists in molding the toe end of an upper, off the last, to give it substantially the shape which it is to have in the finished shoe and to form a marginal flange extending heightwise of the toe, and trimming said flange between points at opposite sides of the toe so located as to leave untrimmed portions substantially at the ends of the tip seam to assist subsequently in the side-lasting of the shoe.

6. That improvement in methods of making shoes which consists in shaping the toe end of a welt shoe upper prior to the side lasting of the shoe, and while holding the marginal portion of the toe of the upper under shaping pressure trimming it by a cut substantially parallel to its edge and terminating in front of the tip seam at each side of the toe.

7. That improvement in methods of making shoes which consists in molding an end of an upper to give it substantially the shape which it is to have in the finished shoe, and while the upper is under molding pressure trimming its marginal portion by a cut so located as to leave the waste material attached to the upper to be removed after the upper is released from the molding pressure.

8. That improvement in methods of making shoes which consists in molding the toe end of an upper over a form to produce a marginal flange upstanding relatively to the bottom of the form, trimming said flange between points at opposite sides of the toe by a cut so located as to leave the waste material attached to the upper, and removing the upper from the form while said waste material is thus attached.

9. That improvement in methods of making shoes which consists in shaping an upper by pressure applied at its margin, and while holding the upper under pressure trimming the margin by a cut so located as to leave the waste material attached to the upper.

In testimony whereof I have signed my name to this specification.

WILLIAM C. BAXTER.